United States Patent
Koreeda

(10) Patent No.: US 6,777,667 B2
(45) Date of Patent: Aug. 17, 2004

(54) SCANNING OPTICAL SYSTEM

(75) Inventor: Daisuke Koreeda, Tokyo (JP)

(73) Assignee: PENTAX Corporation, Tokyo (JP)

(*) Notice: Subject to any disclaimer, the term of this patent is extended or adjusted under 35 U.S.C. 154(b) by 70 days.

(21) Appl. No.: 09/993,487

(22) Filed: Nov. 27, 2001

(65) Prior Publication Data

US 2002/0063203 A1 May 30, 2002

(30) Foreign Application Priority Data

Nov. 27, 2000 (JP) ........................................ 2000-359745

(51) Int. Cl.$^7$ ............................................. G02B 26/08
(52) U.S. Cl. ..................... 250/234; 250/236; 359/204; 347/241
(58) Field of Search .............................. 250/234, 235, 250/236, 557; 359/201, 204, 205, 206, 215, 216; 347/233, 232, 243, 241

(56) References Cited

U.S. PATENT DOCUMENTS

| 5,181,137 A | 1/1993 | Koide | |
| 6,061,079 A | * 5/2000 | Ota et al. | 347/243 |
| 6,317,245 B1 | 11/2001 | Hama et al. | |
| 2001/0002152 A1 | * 5/2001 | Ohno et al. | 359/204 |
| 2001/0026392 A1 | * 10/2001 | Hama et al. | 359/204 |

* cited by examiner

Primary Examiner—Kevin Pyo
(74) Attorney, Agent, or Firm—Greenblum & Bernstein, P.L.C.

(57) ABSTRACT

Disclosed is a scanning optical system that includes a laser source for emitting a laser beam, a scanning deflector that deflects the laser beam, an imaging optical system that converges the scanning laser beam onto an object surface, first and second mirrors that bend the optical path of the scanning laser beam. The first and second mirrors are movable to adjust the optical path length between the deflector and the object surface for changing a width of the scanning range on the object surface. Since the optical path length is adjusted by moving the first and second mirror, which changes the width of the scanning range, correcting the size error of the printed image. When the size error of the printed image is detected, an operator moves the first and second mirrors to correct it.

13 Claims, 3 Drawing Sheets

SCANNING OPTICAL SYSTEM

BACKGROUND OF THE INVENTION

The present invention relates to a scanning optical system employed in a scanning optical device such as a color laser beam printer.

A scanning optical device is provided with a scanning optical system, a developing unit, a fusing unit, a sheet feeding mechanism or the like.

In the scanning optical system, a laser beam emitted from a laser source is deflected by a polygon mirror and forms a beam spot on an object surface such as a photoconductive drum through an imaging optical system. The beam spot formed on the object surface moves (i.e., scans) on the object surface in a predetermined scanning direction as the polygon mirror rotates.

In this specification, a scanning direction of the beam spot on the object surface is referred to as a "main scanning direction" and a direction perpendicular to the main scanning direction on the object surface is referred to as an "auxiliary scanning direction". Shapes and orientations of powers of respective optical elements will be defined on the basis of these scanning directions.

The laser beam is modulated by an input signal to form a latent image onto the object surface and the latent image is developed by the developing unit with toner. The toner is transferred to a sheet of paper and fused in place by the fusing unit.

In a scanning optical system, a width of a scanning range on the object surface may be out of order due to processing error of the optical elements or misalignment thereof. The error of the width of the scanning range causes size error of an image printed on the paper.

The problem of the size error becomes increasingly serious in a tandem type scanning optical device such as a color laser beam printer that has a plurality of scanning optical systems. A tandem type scanning optical device for a color laser beam printer is provided with four laser sources and four photoconductive drums that correspond to colors Y (yellow), M (magenta), C (cyan) and K (black), respectively. Four light beams are deflected by the polygon mirror and converged through the imaging optical systems to form scanning lines on the respective photoconductive drums. In the tandem type scanning optical system, the size error in at least one of the scanning optical systems causes mismatching of colors, which is a critical defect for the color laser beam printer.

SUMMARY OF THE INVENTION

It is therefore an object of the invention to provide an improved scanning optical system that is capable of correcting the size error of the printed image.

For the above object, according to the present invention, there is provided a scanning optical system, including a laser source for emitting a laser beam, a scanning deflector that deflects the laser beam, an imaging optical system that converges the scanning laser beam onto an object surface, first and second mirrors that bend the optical path of the scanning laser beam, the first and second mirrors being movable to adjust the optical path length between the deflector and the object surface for changing a width of the scanning range on the object surface.

With this construction, since the optical path length is adjusted by moving the first and second mirror, which changes the width of the scanning range, correcting the size error of the printed image. Therefore, when the size error is detected, an operator moves the first and second mirrors to correct it. In the case of the tandem type scanning optical device, the operator adjusts the first and second mirrors of the respective scanning optical systems in order to match the widths of the respective scanning ranges to each other.

However, the width of the scanning range cannot be changed when the first and second mirrors are located in an optical path where the scanning beam at any scan angle is parallel to the optical axis of the imaging optical system. Therefore, at least one of the first and second mirrors should be located in an optical path where the scanning beam whose scan angle is not zero is not parallel to the optical axis of the imaging optical system in order to change the width of the scanning range by the movements of the first and second mirrors.

The first and second mirrors may move while keeping the position of the scanning line formed on the object surface in an auxiliary scanning direction. On the other hand, when the movements of the first and second mirror change the position of the scanning line in the auxiliary scanning direction, the timing of the applied signal to the laser source should be shifted.

It is preferable that the optical path between the deflector and the first mirror intersects the optical path between the second mirror and the object surface to reduce the occupied space of the scanning optical system.

The moving amount of the second mirror may be proportional to the moving amount of the first mirror.

Further, the first and second mirrors may be supported so as to be moved as a single-piece. Particularly, the first and second mirrors can be formed as a single-piece.

The imaging optical system may comprise a plurality of lens elements. In such a case, the first and second mirrors may be arranged between the lens elements. The lens element between the second mirror and the object surface may be moved with the movement of the second mirror.

DETAILED DESCRIPTION OF THE PREFERRED EMBODIMENTS

A scanning optical system of the present invention will be described with reference to FIGS. 1 through 5.

First Embodiment

Figure 1:
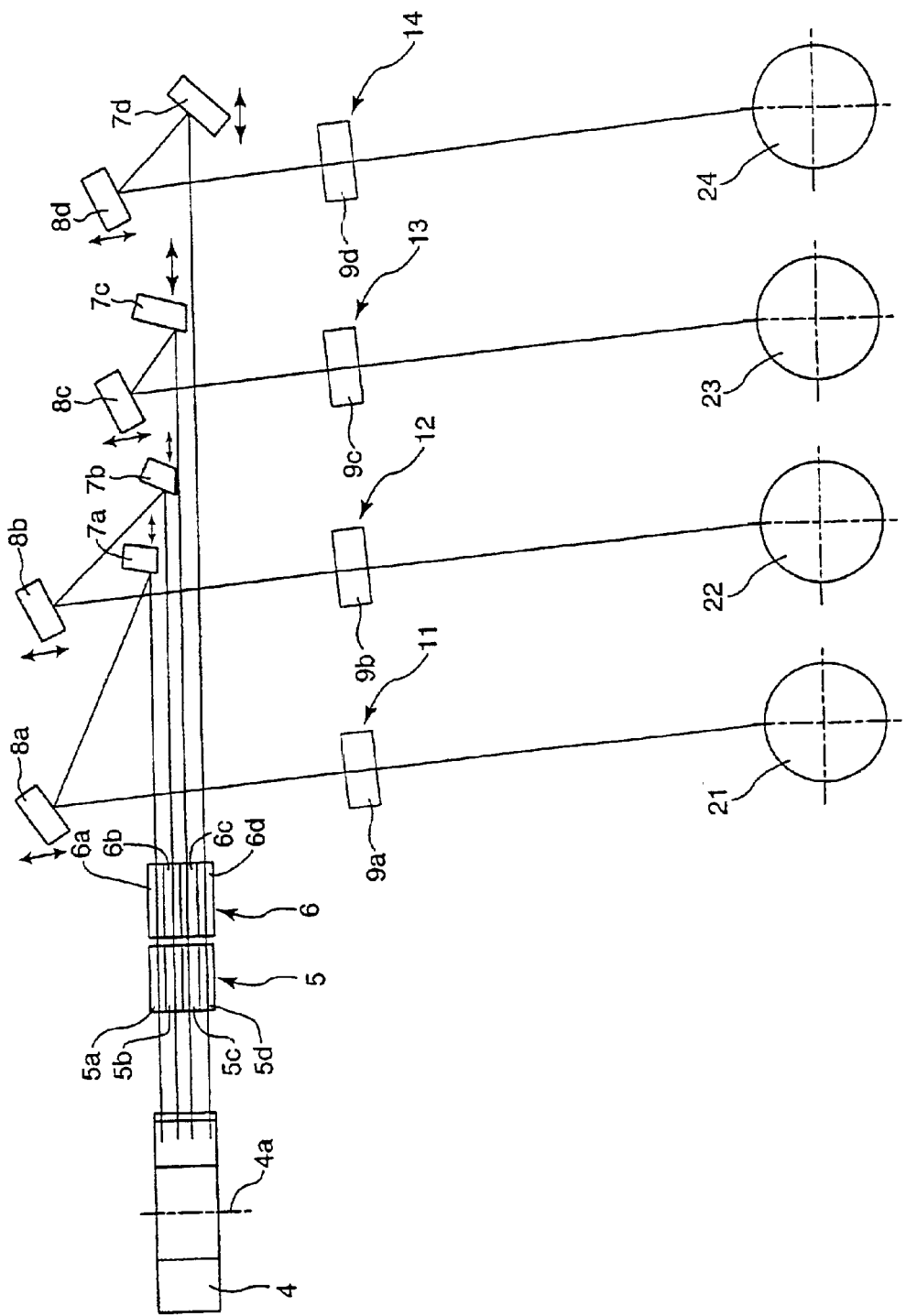
FIG. 1 shows a tandem type scanning optical device that employs scanning optical systems according to the present invention in the auxiliary scanning direction.
Figure 2:
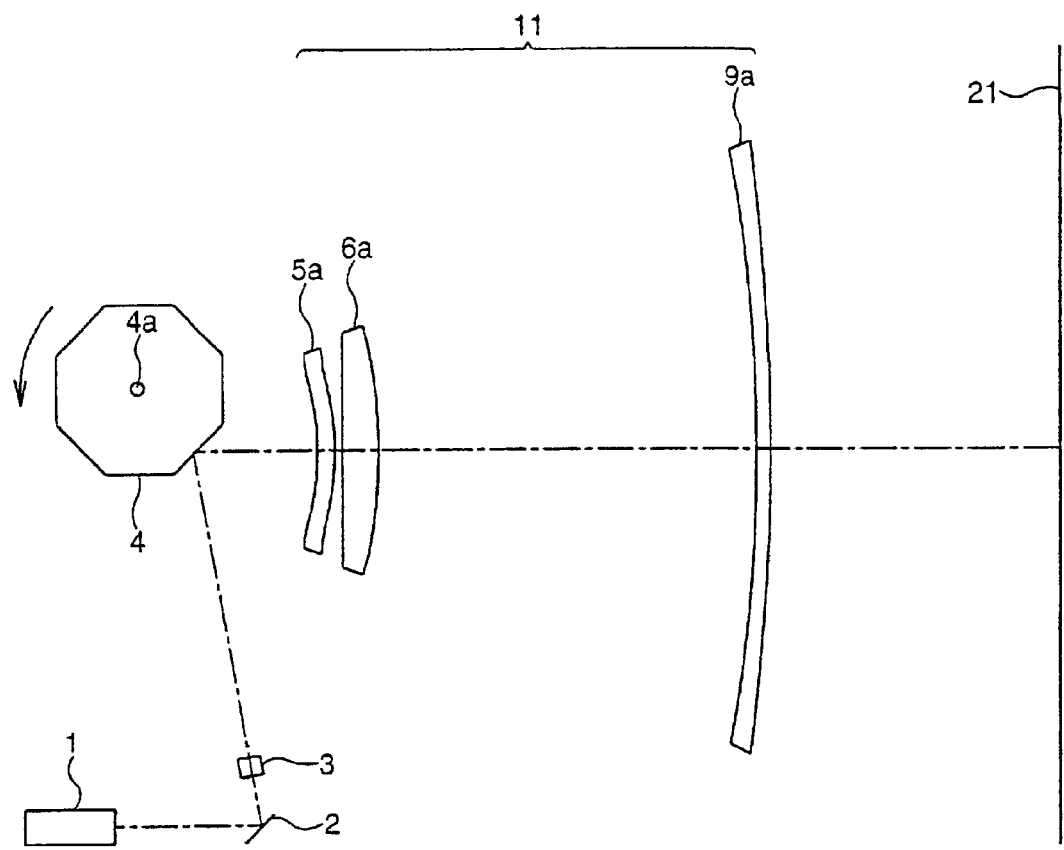
FIG. 2 shows one scanning optical system of the scanning optical device in the developed fashion in the main scanning direction.

A first embodiment of the invention will be described with reference to FIGS. 1 to 3. FIG. 1 shows a tandem type scanning optical device that employs four scanning optical systems. FIG. 1 is a view in the auxiliary scanning direction showing optical elements from a common polygon mirror to respective photoconductive drums. FIG. 2 shows one scanning optical system of the scanning optical device in the developed fashion in the main scanning direction.

As shown in FIG. 1, the tandem type scanning optical system has four scanning optical systems that consist of a common polygon mirror 4 as a scanning deflector that deflects the laser beams, four fθ lenses 11, 12, 13 and 14 as imaging optical systems that converge the scanning laser beams onto the respective photoconductive drums 21, 22, 23 and 24 as object surfaces to be scanned, and first and second mirrors 7a and 8a, 7b and 8b, 7c and 8c, 7d and 8d.

As shown in FIG. 2, a laser beam emitted from a laser source 1 is reflected by a folding mirror 2 and converged by a cylindrical lens 3 only in the auxiliary scanning direction. The laser beam passing through the cylindrical lens 3 is deflected by the polygon mirror 4 and is converged onto the photoconductive drum 21 through the fθ lens 11. The fθ lens 11 consists of a first lens 5a and a second lens 6a that are located in the vicinity of the polygon mirror 4, and a third lens 9a that is located at the side of the photoconductive drum 21. In the same manner, each scanning optical system has a laser source, a folding mirror and a cylindrical lens. Further, the fθ lenses 12, 13 and 14 consists of first lenses 5b, 5c, 5d, second lenses 6b, 6c, 6d and third lenses 9b, 9c, 9d, respectively.

The first lenses 5a to 5d constitute a first complex lens that is formed as a single-piece element and it is equivalent to the combination of four independent lenses stacked one on another. The second lenses 6a to 6d constitute a second complex lens 6. The optical axes of the first lenses 5a to 5d are coaxial to the optical axes of the second lenses 6a to 6d, respectively.

The polygon mirror 4 deflects the four laser beams, which are emitted from light sources 1 and modulated independently, at the same time, and the fθ lenses 11 to 14 converge the four laser beams onto the respective photoconductive drums 21, 22, 23 and 24. Rotation of the polygon mirror 4 about a rotation axis 4a scans the laser beam on the photoconductive drums to form four scanning lines at the same time.

In FIG. 1, the laser beam deflected by the polygon mirror 4 at the highest point among the four laser beams passes through the highest first and second lenses 5a and 6a. The laser beam is reflected by the first mirror 7a upwards and then reflected by the second mirror 8a downwards. As a result, the optical path between the polygon mirror 4 and the first mirror 7a intersects the optical path between the second mirror 8a and the photoconductive drum 21. The reflected laser beam passes through the third lens 9a and is converged onto the photoconductive drum 21. In the same manner, the second, third and fourth laser beams from the top pass the first and second lenses 5b, 5c, 5d and 6b, 6c, 6d and they are reflected by the first mirrors 7b, 7c, 7d upwards and then reflected by the second mirrors 8b, 8c, 8d downwards, respectively. The reflected second, third and fourth laser beams pass through the third lenses 9b, 9c and 9d and are converged onto the photoconductive drums 22, 23 and 24, respectively.

The first and second mirrors 7a to 7d and 8a to 8d are movable to adjust the optical path length between the polygon mirror 4 and the photoconductive drums 21 to 24 for changing a width of the scanning range on the photoconductive drums. The first mirrors 7a to 7d are movable in directions of the optical axes of the first and second lenses 5a to 5d and 6a to 6d. The second mirrors 8a to 8d are movable in directions of folded optical axes by the second mirrors that are coincident with the optical axes of the third lenses 9a to 9d. The moving amounts of the second mirrors 8a to 8d are proportional to the moving amount of the respective first mirror 7a to 7d so as to keep the position of the scanning line formed on the photoconductive drums 21 to 24 in an auxiliary scanning direction.

The first mirrors 7a to 7d are supported by frames that are movable along guide rails in the directions of the optical axes of the first and second lenses 5a to 5d and 6a to 6d. The second mirrors 8a to 8d are supported by frames that are movable along guide rails in the directions of the optical axes of the third lenses 9a to 9d. The position of the first and second mirrors 7a to 7d and 8a to 8d are moved by tightening or loosing bolts that engage the frames.

Figure 3:
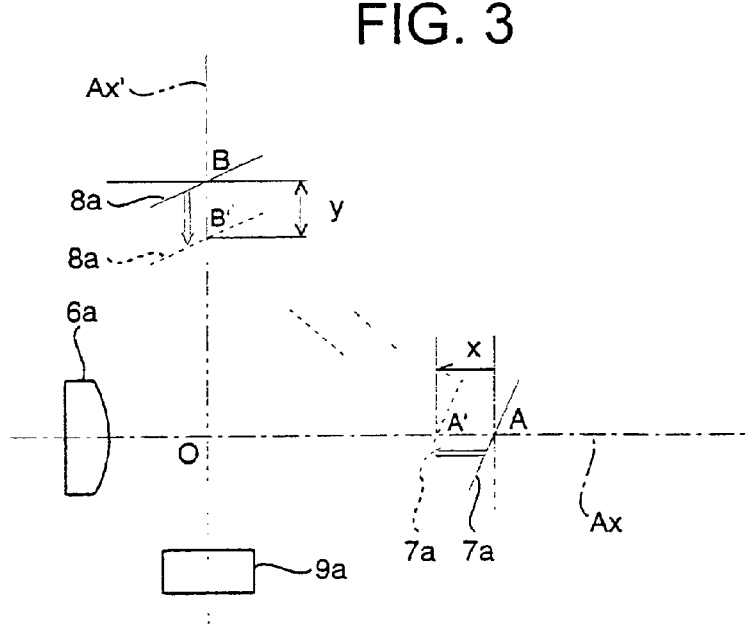
FIG. 3 shows the movements of first and second mirrors in the auxiliary scanning direction according to a first embodiment.

FIG. 3 shows the movements of first and second mirrors in the auxiliary scanning direction according to the first embodiment. In FIG. 3, the optical axis Ax of the second lens 6a intersects the optical axis Ax' of the third lens 9a at a right angle. A symbol O represents the intersection of the optical axes Ax and Ax'. However, there are not significant difference in a function and an effect when the optical axis Ax is not perpendicular to the optical axis Ax' as shown in FIG. 1.

As shown in FIG. 3, when the first mirror 7a moves from the position shown by the solid line to the position shown by the dotted line, the intersection of the first mirror 7a and the optical axis Ax moves from the position A to the position A'. The moving amount of the first mirror 7a is represented by Δx. In such a case, the second mirror 8a moves from the position shown by the solid line to the position shown by the dotted line, the intersection of the second mirror 8a and the optical axis Ax' moves from the position B to the position B'. The moving amount Δy of the second mirror 8a is determined according to the following equation.

$$\Delta y = (OB/OA)\Delta x$$

Since the moving amount Δy is determined by the above proportional relationship, the triangle OA'B' after the movement is geometrically similar to the triangle OAB before the movement, which keeps the angles ∠OAB (=∠OA'B') and ∠OBA (=∠OB'A'). Further, since the optical axis Ax' does not move by the adjustment and the intersection B and B' are located on the optical axis Ax', the position of the scanning line formed on the photoconductive drum 21 can be kept in an auxiliary scanning direction.

The movement of the first and second mirrors 7a and 8b as shown in FIG. 3 changes the optical path length by the difference between perimeters of the triangles OA'B' and OAB, which changes the width of the scanning range on the photoconductive drum 21.

FIG. 3 shows one scanning optical system only, while the remaining scanning optical systems are also provided with the same moving mechanisms, the widths of the scanning ranges can be adjusted. Therefore, when the size error is detected, an operator can match the widths of the respective scanning ranges to each other by moving the first and second mirrors.

The moving amounts of the mirrors shown in FIG. 3 are exaggerated for purposes of illustration. Further, since the focal depth of the fθ lens is adequately deep, the change of the optical path length hardly effects a diameter or a shape of the beam spot.

Second Embodiment

Figure 4:
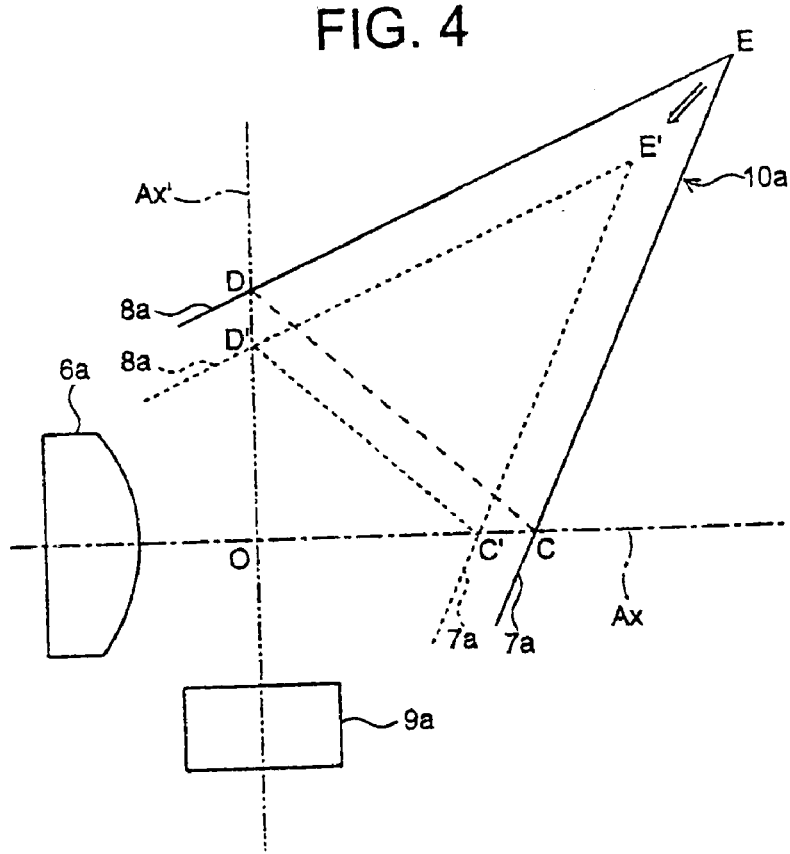
FIG. 4 shows the movements of the first and second mirrors in the auxiliary scanning direction according to a second embodiment.

FIG. 4 shows the movements of the first and second mirrors 7a and 8a in the auxiliary scanning direction according to a second embodiment. In the second embodiment, the first and second mirrors 7a and 8a are connected to each other to form a single-piece combination mirror 10a.

As shown in FIG. 4, when the combination mirror 10a moves from the position shown by the solid line to the position shown by the dotted line, the intersection of the first and second mirrors 7a and 8a moves from the position E to the position E'. Accordingly, the intersection of the first mirror 7a and the optical axis Ax moves from the position C to the position C' and the intersection of the second mirror 8a and the optical axis Ax' moves from the position D to the position D'.

Since the triangle OC'D' after the movement is geometrically similar to the triangle OCD before the movement, which keeps the angles ∠OCD (=∠OC'D') and ∠ODC (=∠OD'C'). Further, since the optical axis Ax' does not move by the adjustment and the intersections D and D' are located on the optical axis Ax', the position of the scanning line formed on the photoconductive drum 21 can be kept in an auxiliary scanning direction.

The movement of the first and second mirrors 7a and 8b as shown in FIG. 4 changes the optical path length by the difference between perimeters of the triangles OC'D' and OCD, which changes the width of the scanning range on the photoconductive drum 21.

Third Embodiment

Figure 5:
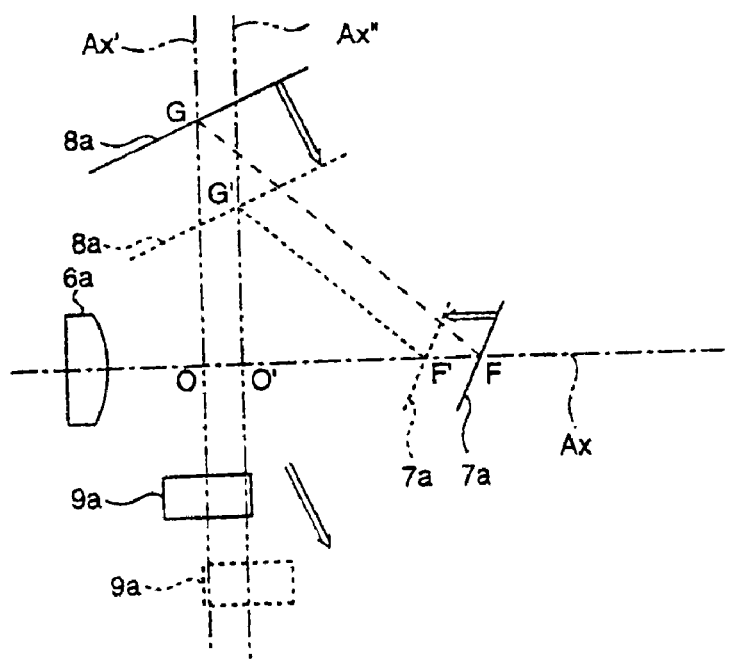
FIG. 5 shows the movements of the first and second mirrors in the auxiliary scanning direction according to a third embodiment.

FIG. 5 shows the movements of the first and second mirrors 7a and 8a in the auxiliary scanning direction according to a third embodiment. In the third embodiment, the third lens 9a moves with the movement of the second mirror 8a.

As shown in FIG. 5, when the first mirror 7a moves from the position shown by the solid line to the position shown by the dotted line, the intersection of the mirror 7a and the optical axis Ax moves from the position F to the position F'. When the second mirror 8a and the third lens 9a move from the position shown by the solid line to the position shown by the dotted line, the optical axis of the third lens 9a moves from the position Ax' to the position Ax". The intersection G of the second mirror 8a and the optical axis Ax' moves to the intersection G' of the second mirror 8a and the optical axis Ax".

Since the triangle OF'G' after the movement is geometrically similar to the triangle OFG before the movement, which keeps the angles ∠OFG (=∠OF'G') and ∠OGF (=∠OG'F').

The movement of the first and second mirrors 7a and 8b as shown in FIG. 5 changes the optical path length by the difference between perimeters of the triangles OF'G' and OFG, which changes the width of the scanning range on the photoconductive drum 21.

Further, since the position of the scanning line formed on the photoconductive drum 21 moves in an auxiliary scanning direction by the movements of the first and second mirrors and the third lens, the timing of the applied signal to the laser source should be shifted.

The optical systems shown in FIGS. 4 and 5 are also applied to the tandem type scanning optical device as shown in FIG. 1. Since the constructions except the moving mechanism of the first and second mirrors are the same as the first embodiment, the repetitions are omitted.

The present disclosure relates to subject matter contained in Japanese Patent Application No. 2000-359745 filed on Nov. 27, 2000, which is expressly incorporated herein by reference in its entirety.

What is claimed is:

1. A scanning optical system, comprising:
a laser source for emitting a laser beam;
a scanning deflector that deflects the laser beam;
an imaging optical system that converges the scanning laser beam onto an object surface; and
first and second mirrors that bend the optical path of the scanning laser beam, said first and second mirrors being movable to adjust the optical path length between said deflector and said object surface for changing a width of the scanning range on said object surface.

2. The scanning optical system according to claim 1, wherein said first and second mirrors move while keeping the position of the scanning line formed on said object surface in an auxiliary scanning direction.

3. The scanning optical system according to claim 1, wherein the optical path between said deflector and said first mirror intersects the optical path between said second mirror and said object surface.

4. The scanning optical system according to claim 1, wherein the moving amount of said second mirror is proportional to the moving amount of said first mirror.

5. The scanning optical system according to claim 1, wherein said first and second mirrors are supported so as to be unitarily moved.

6. The scanning optical system according to claim 5, wherein said first and second mirrors comprise a unitary member.

7. The scanning optical system according to claim 1, wherein said imaging optical system comprises a plurality of lens elements and said first and second mirrors are positioned between said lens elements.

8. The scanning optical system according to claim 7, wherein the lens element positioned between said second mirror and said object surface is moved together with the movement of said second mirror.

9. A scanning optical system, comprising:
a laser source that emits a laser beam;
a scanning deflector that deflects the laser beam;
an imaging optical system that converges the scanning laser beam onto an object surface;
first and second mirrors that bend the optical path of the scanning laser beam; and
a mirror mover that moves said first and second mirrors so as to change a width of the scanning range on the object surface.

10. The scanning optical system according to claim 9, said moving mechanism being configured to move said first and second mirrors proportionally.

11. The scanning optical system according to claim 9, wherein said imaging optical system comprises a plurality of lens elements, said first and second mirrors being positioned between said tens elements.

12. The scanning optical system according to claim 11, said first mirror being movable in a direction substantially parallel to an optical axis of a lens element of said optical system positioned upstream of said first mirror, said second mirror being movable in a direction substantially parallel to an optical axis of a lens element of said optical system positioned downstream of said second mirror.

13. The scanning optical system according to claim 9, wherein said first and second mirrors are movable in different directions.

* * * * *